(12) United States Patent
von Liechtenstein

(10) Patent No.: US 12,537,013 B2
(45) Date of Patent: Jan. 27, 2026

(54) AUDIO-VISUAL SPEECH RECOGNITION CONTROL FOR WEARABLE DEVICES

(71) Applicant: Maximilian Ralph Peter von Liechtenstein, Douglas (IM)

(72) Inventor: Maximilian Ralph Peter von Liechtenstein, Douglas (IM)

(*) Notice: Subject to any disclaimer, the term of this patent is extended or adjusted under 35 U.S.C. 154(b) by 157 days.

(21) Appl. No.: 18/406,094

(22) Filed: Jan. 6, 2024

(65) Prior Publication Data
US 2025/0225995 A1    Jul. 10, 2025

(51) Int. Cl.
| | | |
|---|---|---|
| G10L 21/0216 | (2013.01) |
| G06F 3/01 | (2006.01) |
| G10L 13/02 | (2013.01) |
| G10L 15/02 | (2006.01) |
| G10L 15/187 | (2013.01) |
| G10L 15/25 | (2013.01) |
| H04R 23/00 | (2006.01) |

(52) U.S. Cl.
CPC .......... *G10L 21/0216* (2013.01); *G06F 3/013* (2013.01); *G10L 13/02* (2013.01); *G10L 15/02* (2013.01); *G10L 15/187* (2013.01); *G10L 15/25* (2013.01); *G10L 2015/025* (2013.01); *G10L 2021/02166* (2013.01); *H04R 23/008* (2013.01)

(58) Field of Classification Search
CPC ..... G10L 21/0216; G10L 13/02; G10L 15/02; G10L 15/187; G10L 15/25; G10L 2015/025; G10L 2021/02166; G10L 21/0208; G10L 25/51; G06F 3/013; H04R 23/008; H04R 2225/55; H04R 25/554
See application file for complete search history.

(56) References Cited

U.S. PATENT DOCUMENTS

| | | | | |
|---|---|---|---|---|
| 6,633,844 B1* | 10/2003 | Verma | .................... | G10L 15/25 382/209 |
| 8,913,103 B1* | 12/2014 | Sargin | .................... | G06V 40/16 348/14.12 |
| 10,134,084 B1* | 11/2018 | Gabriele | ................ | G06Q 20/12 |
| 10,621,973 B1* | 4/2020 | McVicker | ................ | H04R 1/14 |
| 12,198,698 B1* | 1/2025 | Benster | .................... | G01S 7/412 |
| 2002/0116197 A1* | 8/2002 | Erten | ..................... | G06F 18/254 704/E15.042 |
| 2003/0018475 A1* | 1/2003 | Basu | .................... | G06V 40/161 704/E11.003 |
| 2004/0186718 A1* | 9/2004 | Nefian | .................. | G10L 15/142 704/256 |

(Continued)

*Primary Examiner* — Fariba Sirjani

(57) ABSTRACT

An apparatus is described herein related to detecting and processing silent speech. The apparatus comprises a head-mountable device and at least one ear-mountable device, wherein the ear-mountable devices are configured to selectively pick up both head-internal and head-externals sounds, thus enabling silent speech to be detectable and wherein the head-mountable device comprises an eye tracking unit capable of determining a gaze dwell of a user of the device, thus enabling silent speech commands to be directed at objects subject to a gaze dwell, or enabling speech or audio originating from an interlocutor who is subject to a gaze dwell to be selectively enhanced. Methods are described herein relate to the application of semantic intent derived from a silent speech to real-word objects which are subject to a gaze dwell by a user.

7 Claims, 9 Drawing Sheets

(56) References Cited

U.S. PATENT DOCUMENTS

| | | | |
|---|---|---|---|
| 2008/0082341 A1* | 4/2008 | Blair | G10L 15/08 |
| | | | 704/275 |
| 2012/0143605 A1* | 6/2012 | Thorsen | G10L 15/183 |
| | | | 704/235 |
| 2018/0004287 A1* | 1/2018 | Yoo | G06F 3/0482 |
| 2018/0234761 A1* | 8/2018 | Fishman | H04R 3/005 |
| 2019/0019508 A1* | 1/2019 | Rochford | G06F 3/013 |
| 2019/0251970 A1* | 8/2019 | Shukla | G10L 15/25 |
| 2021/0327431 A1* | 10/2021 | Stewart | G06V 40/45 |
| 2021/0397407 A1* | 12/2021 | Eubank | G10K 11/17885 |
| 2022/0246060 A1* | 8/2022 | De Salvo | G02B 27/0093 |
| 2022/0409134 A1* | 12/2022 | Oztaskent | H04R 1/1016 |
| 2023/0071778 A1* | 3/2023 | Du | G10L 21/18 |
| 2024/0211204 A1* | 6/2024 | Gatzke | G06F 3/167 |
| 2024/0221753 A1* | 7/2024 | Garg | G10L 13/047 |
| 2025/0225995 A1* | 7/2025 | von Liechtenstein | G10L 13/02 |

* cited by examiner

AUDIO-VISUAL SPEECH RECOGNITION CONTROL FOR WEARABLE DEVICES

BACKGROUND OF THE INVENTIONS

1. Field of the Inventions

Example embodiments relate to apparatus and methods for processing silent speech, silent sounds, linking visual cues and visual speech recognition with audio signals, enhancing speech audio with the results of audiovisual speech recognition, controlling a device with silent audio commands by using smart earplugs in conjunction with other portable or wearable devices.

2. Description of the Related Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

Any discussion of the related art throughout the specification should in no way be considered as an admission that such related art is widely known or forms part of common general knowledge in the field.

When working with speech input, such as speech commands for all kinds of portable and wearable devices, a limiting factor has been background noise. Speech input is currently only suited for environments which are naturally quiet. For such quiet environments there a number of solutions, such as Amazon Alexa for speech-driven command input or Apple Siri with voice control to navigate and interact with a device using voice to tap, swipe, type, and more. However such type of input is fraught with problems when there are high levels of ambient noise, especially when there are multiple speakers, speaking simultaneously.

Also the use of virtual assistants which are voice-controlled is fraught with the privacy problem, in the sense that any bystander in a crowded can overhear voice interactions between a user and their virtual assistant.

In hearing aid type of use cases there are similar problems. The current generation of hearing aids features digital signal processing which offers improved quality in isolating and enhancing speech per se. However, the current state of the art does not allow for distinguishing between speakers and for discriminating between speakers based on a detected interest by the user of the device.

SUMMARY OF THE INVENTIONS

The present invention recognizes that it is desirable for a user of a speech-enabled device to be able to communicate with the device in such a way that it becomes possible to use speech input in a noisy environment. An embodiment of the invention uses silent speech to realize that aim. Silent speech is when a user either mimes speech, whispers or speaks in such a low volume that an interlocutor in the vicinity would not be expected to be able to hear or understand the speech. The inventor has realized that a lot of people using mobile devices would generally like to use speech input, but are too shy, too private or too self-aware to use audible speech input in a crowded place with strangers around. Hence by using inaudible speech, speech input can be used and the problem of lack of privacy is eliminated.

Another embodiment uses silent sound to control an electronic device. Silent sound is a sound used as a control input which cannot normally be heard by interlocutor in the immediate vicinity of the user. Examples of such silent sounds are a soft clatter of teeth, clicking the tongue or gently touching of the front teeth with the tongue. A command interpreter can translate such silent sounds into control inputs of an electronic device.

The prior art knows of ways to control a visual pointer, such as a mouse pointer, by eye tracking. The prior art also knows that it is desirable to offer a hands-free mode for being able to operate wearable devices at times where the user needs their hands free to accomplish another task. The prior art has ways to position a mouse-type pointer at a location where the user is directing their gaze and it is possible to simulate a mouse click with gestures, such as an eye gesture, of which a wink would be an example. The inventor has realized that the drawback of the prior art is that the known methods to simulate a mouse click with a gesture are all very straining. In other words, whilst it is certainly feasible to simulate an occasional mouse click with a gesture, it becomes prohibitively straining when these mouse click type inputs become very frequent. Fatigue sets in very quickly and also such movements, like conscious winking and blinking, feel so unnatural, that repeating such movements frequently makes for an unpleasant user experience. The same is true for hand gestures. Hand gestures may not be as physiologically straining as winking gestures, but they have the disadvantage that they are socially awkward. It is socially unsettling to be seen talking seemingly to oneself or be seen making strange hand movements, actions that have in the past been primarily associated as an indication of insanity and for which there is even now a subconscious unease when people perform these kind of actions in a public setting when interacting with their personal portable or wearable computing devices. The inventor has realized that especially gentle tongue movements exhibit none of the aforementioned disadvantages when used as a means for making mouse click type inputs to a computing device. It is not socially awkward in any way, since nobody even in the immediate vicinity of the user has any way of telling that the user is even making these command inputs. It is also extremely private and secure since these types of input cannot be easily picked up or intercepted by potentially malicious onlookers. Also tongue movements have the major advantage that they are not straining. It is possible for the tongue to very gently touch the front teeth in a soft clicking type motion for hundreds of times in a row, without strain, fatigue or discomfort setting in. The same is true for a soft clatter of the teeth. A teeth clatter needs to be only extremely faint in order to be observable by the innovative microphone technology which is also subject of this specification. Hence in a preferred embodiment a wearable or portable device is controlled by steering a pointer by gaze to a control surface and by making selections in such a way that a silent sound is produced when the pointer is positioned over a click-enabled control surface. A pointer is optional, it is also possible to just direct a gaze to an object of interest and by making a silent sound control input at the same time. The preferred embodiment also comprises a silent speech mode, whereby the wearable or portable device is controlled by speech input, or whereby the devices is accepting speech input for other purposes, such for speech-to-text or real time speech interpretation/translation kind of scenarios.

Silent speech is especially advantageous for applications where security is of paramount concern, such with authorizations for payments, entering passwords and PINs and for unlocking of any kind. Especially in a setting where perhaps no screen is available and/or no touchpad. An embodiment is realized as a wearable earphone type device, such as smart earplugs or smart headphones. Security-sensitive data may be efficiently entered by silent speech without being interceptable by potentially malicious bystanders. Such input is more secure than tapping in a PIN on a keypad or even using fingerprint recognition. Keypads have the disadvantage that they can be observed when being operated and fingerprint recognition is flawed in the sense that there is no way of ensuring that it is a live fingerprint as opposed to a malicious reproduction of an intercepted fingerprint. Silent speech on the other hand offers the possibility of combining speaker recognition with speech input of sensitive data. Speaker Recognition is the problem of identifying a speaker from a recording of their speech. It is an important topic in Speech Signal Processing and has a variety of applications, especially in security systems. Voice controlled devices also rely heavily on speaker recognition. The main principle behind speaker recognition is extraction of features from speech which are characteristic to a speaker, followed by training on a data set and testing. Hence an innovation departure of the present invention is the combination of speaker recognition and silent speech for the input of sensitive information in order to gain access, such as PINs and passwords.

Another embodiment of the invention is an apparatus to enhance speech. Eye tracking of the user is used to determine a gaze to an interlocutor and the gaze is used to determine a bearing to the interlocutor. Once a bearing is obtained then sound not coming from the direction of the bearing is actively filtered. Hence an embodiment of the present invention is useful as a hearing aid. In another embodiment sound coming from the direction of the bearing is analyzed with the aid of a language model and sound is enhanced in such a way that speech coming from the interlocutor is enhanced in real time.

The inventor has realized that for silent sound inputs and for silent speech inputs to be possible innovative microphones are of particular importance. In one embodiment a set of earpieces for each ear is of the type which is useful for listening to music. The earpieces comprise not only loudspeakers for producing the output sound, but also a set of microphones. In one embodiment there is one microphone on the outside of the earpieces, such as for picking up sounds and noise coming primarily from the outside world, i.e. away from the user. The said embodiment also comprises a microphone on the inside of the earpiece for picking up sounds and noises which are transmitted through the user's head. It is those sounds and noises which may comprise silent speech and noises such as a clatter of the user's teeth or a clicking of the user's tongue which may be used as a command input. An advantage of such earpieces having outside-facing and inside-facing microphones is that sounds originating inside the user's head can therefore be filtered and amplified by known active noise cancellation techniques. Alternative embodiments comprise bone-conducting transducers which may be attached to the frame of smart-glasses or cartilage-conducting transducers which may be attached to the earpiece and touch the concha of the user's ear when the device is in operation. Such transducers are also able to pick up sounds and noises originating from inside the user's head. It is possible to use such transducers in isolation, or in combination with the aforementioned set of microphones. A combination is advantageous in the sense that it aids the performance of active noise cancellation in order to filter out the signal from the ambient noise.

The inventor has realized that laser microphones offer special advantages when used for implementing the internal microphones. This is because the laser light can be directed directly onto the ear drum of the user in such a way that vibrations of the membrane can be picked up with great precision and it is these vibrations which tend to comprise a signal rich in silent speech and silent noise control inputs.

There has thus been outlined, rather broadly, some of the features of the silent sound and silent speech apparatus and method in order that the detailed description thereof may be better understood, and in order that the present contribution to the art may be better appreciated. There are additional features of apparatus and methods that will be described hereinafter and that will form the subject matter of the claims appended hereto. In this respect, before explaining at least one embodiment of the apparatus and method in detail, it is to be understood that the technique is not limited in its application to the details of construction or to the arrangements of the components set forth in the following description or illustrated in the drawings. The described technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

Figure 1:
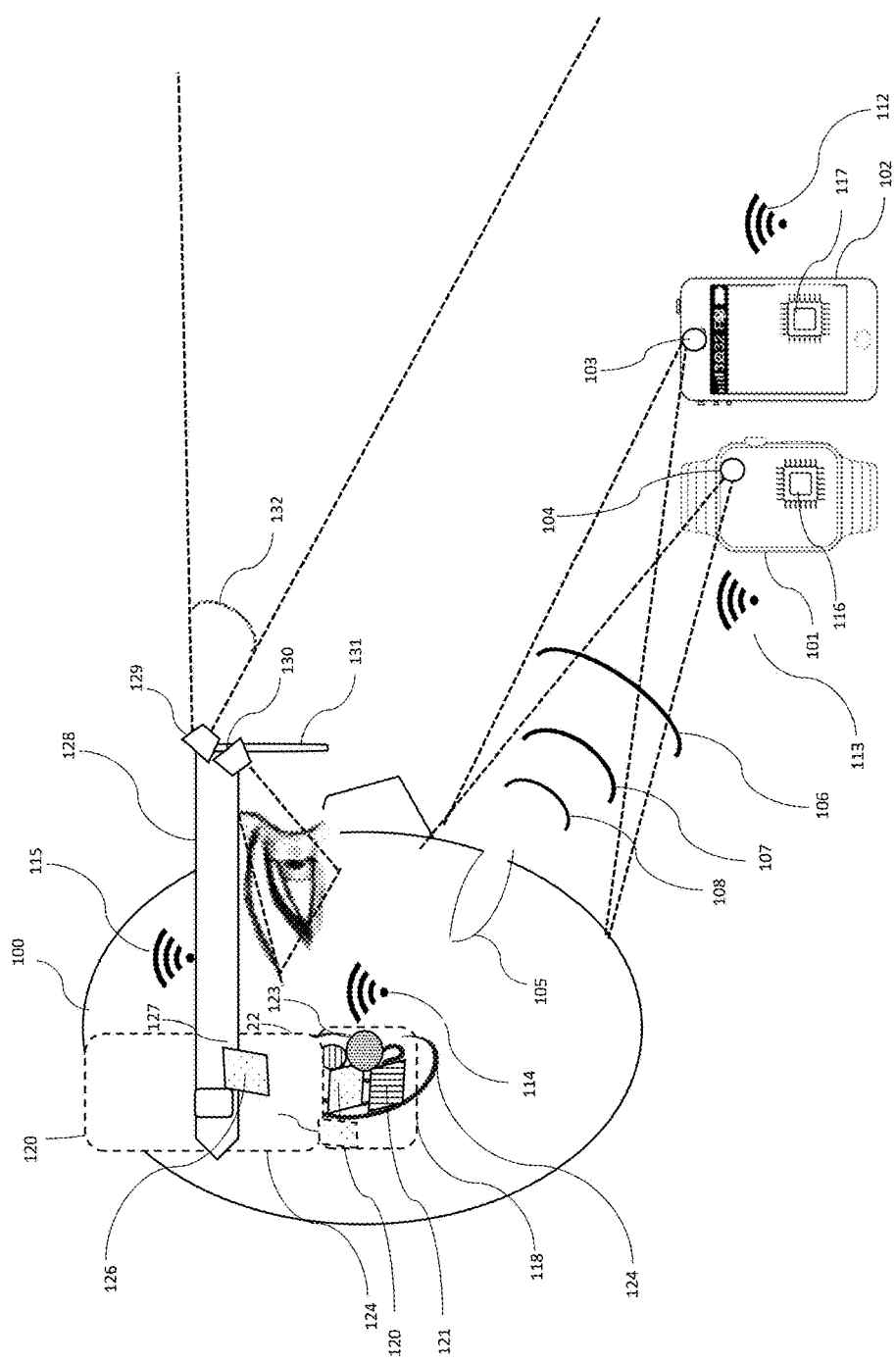
FIG. 1 illustrates a schematic view of an embodiment of the invention.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit." "module" or "system" Furthermore, aspects of the present inventions may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention recognizes that it is desirable for a user of a speech-enabled device to be able to communicate with the device in such a way that it becomes possible to use speech input in a noisy environment. An embodiment of the invention uses silent speech to realize that aim. Silent speech is when a user either mimes speech, whispers or speaks in such a low volume that an interlocutor in the vicinity would not be expected to be able to hear or understand the speech. The inventor has realized that a lot of people using mobile devices would generally like to use speech input, but are too shy, too private or too self-aware to use audible speech input in a crowded place with strangers around. Hence by using inaudible speech, speech input can be used and the problem of lack of privacy is eliminated.

Another embodiment uses silent sound to control an electronic device. Silent sound is a sound used as a control input which cannot normally be heard by interlocutor in the immediate vicinity of the user. Examples of such silent sounds are a soft clatter of teeth, clicking the tongue or gently touching of the front teeth with the tongue. A command interpreter can translate such silent sounds into control inputs of an electronic device.

The prior art knows of ways to control a visual pointer, such as a mouse pointer, by eye tracking. The prior art also knows that it is desirable to offer a hands-free mode for being able to operate wearable devices at times where the user needs their hands free to accomplish another task. The prior art has ways to position a mouse-type pointer at a location where the user is directing their gaze and it is possible to simulate a mouse click with gestures, such as an eye gesture, of which a wink would be an example. The inventor has realized that the drawback of the prior art is that the known methods to simulate a mouse click with a gesture are all very straining. In other words, whilst it is certainly feasible to simulate an occasional mouse click with a gesture, it becomes prohibitively straining when these mouse click type inputs become very frequent. Fatigue sets in very quickly and also such movements like conscious winking and blinking feel so unnatural, that repeating such movements frequently makes for an unpleasant user experience. The same is true for hand gestures. Hand gestures may not be as physiologically straining as winking gestures, but they have the disadvantage that they are socially awkward. It is socially unsettling to be seen talking seemingly to oneself or be seen making strange hand movements, actions that have in the past been primarily associated as an indication of insanity and for which there is even now a subconscious unease when people perform these kind of actions in a public setting when interacting with their personal portable or wearable computing devices. The inventor has realized that especially gentle tongue movements exhibit none of the aforementioned disadvantages when used as a means for making mouse click type inputs to a computing device. It is not socially awkward in any way, since nobody even in the immediate vicinity of the user has any way of telling that the user is even making these command inputs. It is also extremely private and secure since these types of input cannot be easily picked up or intercepted by potentially malicious onlookers. Also tongue movements have the major advantage that they are not straining. It is possible for the tongue to touch the front teeth very gently in a soft clicking type motion for hundreds of times in a row, without strain, fatigue or discomfort setting in. The same is true for a soft clatter of the teeth. A teeth clatter needs to be only extremely faint in order to be observable by the innovative microphone technology which is also subject of this specification. Hence in a preferred embodiment a wearable or portable device is controlled by steering a pointer by gaze to a control surface and by making selections in such a way that a silent sound is produced when the pointer is positioned over a click-enabled control surface. A pointer is optional, it is also possible to just direct a gaze to an object of interest and by making a silent sound control input at the same time. The preferred embodiment also comprises a silent speech mode, whereby the wearable or portable device is controlled by speech input, or whereby the devices is accepting speech input for other purposes, such for speech-to-text or real time speech interpretation/translation kind of scenarios.

Silent speech is especially advantageous for applications where security is of paramount concern, such with authorizations for payments, entering passwords and PINs and for unlocking of any kind. Especially in a setting where perhaps no screen is available and/or no touchpad. An embodiment is realized as a wearable earphone type device, such as smart earplugs or smart headphones. Security-sensitive data may be efficiently entered by silent speech without being interceptable by potentially malicious bystanders. Such input is more secure than tapping in a PIN on a keypad or even using fingerprint recognition. Keypads have the disadvantage that they can be observed when being operated and fingerprint recognition is flawed in the sense that there is no way of ensuring that it is a live fingerprint as opposed to a malicious reproduction of an intercepted fingerprint. Silent speech on the other hand offers the possibility of combining speaker recognition with speech input of sensitive data. Speaker Recognition is the problem of identifying a speaker from a recording of their speech. It is an important topic in Speech Signal Processing and has a variety of applications, especially in security systems. Voice controlled devices also rely heavily on speaker recognition. The main principle behind speaker recognition is extraction of features from speech which are characteristic to a speaker, followed by training on a data set and testing. Hence an innovation departure of the present invention is the combination of speaker recognition and silent speech for the input of sensitive information in order to gain access, such as PINs and passwords.

Another embodiment of the invention is an apparatus to enhance speech. Eye tracking of the user is used to determine a gaze to an interlocutor and the gaze is used to determine a bearing to the interlocutor. Once a bearing is obtained then sound not coming from the direction of the bearing is actively filtered. Hence an embodiment of the present invention is useful as a hearing aid. In another embodiment sound coming from the direction of the bearing is analyzed with the aid of a language model and sound is enhanced in such a way that speech coming from the interlocutor is enhanced in real time.

The inventor has realized that for silent sound inputs and for silent speech inputs to be possible innovative microphones are of particular importance. In one embodiment a set of earpieces for each ear is of the type which is useful for listening to music. The earpieces comprise not only loudspeakers for producing the output sound, but also a set of microphones. In one embodiment there is one microphone on the outside of the earpieces, such as for picking up sounds and noise coming primarily from the outside world, i.e. away from the user. The said embodiment also comprises a microphone on the inside of the earpiece for picking up sounds and noises which are transmitted through the user's head. It is those sounds and noises which may comprise silent speech and noises such as a clatter of the user's teeth or a clicking of the user's tongue which may be used as a command input. An advantage of such earpieces having outside-facing and inside-facing microphones is that sounds originating inside the user's head can therefore be filtered and amplified by known active noise cancellation techniques. Alternative embodiments comprise bone-conducting transducers which may be attached to the frame of smart-glasses or cartilage-conducting transducers which may be attached to the earpiece and touch the concha of the user's ear when the device is in operation. Such transducers are also able to pick up sounds and noises originating from inside the user's head. It is possible to use such transducers in isolation, or in combination with the aforementioned set of microphones. A combination is advantageous in the sense that it aids the performance of active noise cancellation in order to filter out the signal from the ambient noise.

The inventor has realized that laser microphones offer special advantages when used for implementing the internal microphones. This is because the laser light can be directed directly onto the ear drum of the user in such a way that vibrations of the membrane can be picked up with great precision and it is these vibrations which tend to comprise a signal rich in silent speech and silent noise control inputs.

FIG. 1 depicts an apparatus embodying a number of principles of the invention. The apparatus comprises a set of portable and/or wearable devices which may be wirelessly networked. A user 100 is wearing smart glasses and wireless ear buds. The user's face, in particular the area around the mouth 105 is observed by cameras 103 104 which may be hosted on a handheld device 102 or wrist-attached device 101. The sound waves associated with speaking are symbolically depicted as curly brackets 106 107 108 109 110 111. The various devices may be interconnected via a wireless connection in order to make up the composite apparatus. The wireless connection is realized with Bluetooth LM in a preferred embodiment. The wireless interconnectivity is symbolized as 112 113 114 115. An advantage of the depicted wireless interconnectivity is that the apparatus can be configured as a distributed computing system whereby the processors 116 117 on the handheld device 102 or the wrist-attached device 101 serve as the main processors of the distributed apparatus. With current technology it is challenging to integrate a processor capable of performing the very processor-intense signal processing and speech processing operations within the earbud device or the smart glasses device. Also, such capable processors require battery power which is difficult to provide within smart glasses or smart ear buds because of the weight of the necessary batteries. In an example embodiment a wrist attached device 101 was implemented with an Padgene DZ09 Bluetooth Smart Watch with an MTK6261 533 Mhz processor. In a further example embodiment, the handheld device 102 was implemented using an Apple iPhone 13 smartphone with a Hexa-core processor (2×3.23 GHz Avalanche+4×1.82 GHz Blizzard) and a 12 MP, f/2.2, 23 mm (wide), 1/3.6" user-facing (selfie) camera and Bluetooth connectivity.

The user 100 is wearing an ear-mountable device 118 which may be wirelessly networked 114 with a smart glasses type device 128 and a hand-held computing device such as 102, or a wrist-strapped computing device, such as 101. Other embodiments are possible, provided that the computing device is equivalent to 101 or 102 in the sense that the computing device comprises a user-facing camera, a processor capable of performing lip reading and speech processing tasks and wireless connectivity to the earpiece 118. The ear mountable device 118 may comprise an outward facing microphone 120, in the sense that the microphone facing away from the user 100 in such a way that environmental sounds, as opposed to sounds originating within the body of the user, are being picked up. The ear mountable device may also comprise an inward-facing microphone 121, in the sense that the microphone is facing the ear of the user and whereby the microphone is configured to preferentially pick up sound originating from within the user's body. In a preferred embodiment microphones 120 and 121 are Cardioid microphones, which are characterized by being unidirectional. They pick up significantly more sound from the front of the capsule than the back and sides. Microphones 120 and 121 are conventional microphones, in the sense that they belong to the three primary types of microphones—dynamic microphones, condenser microphones, and ribbon microphones. In an exemplary embodiment Sonion 6001 Directional Microphones are used for realizing microphones 120 and 121. All three comprise a capsule, sometimes called a baffle, which picks up the sound and converts it to electrical energy. Inside the capsule is a diaphragm, a thin membrane that vibrates when it comes in contact with sound waves, initiating the conversion process. Those skilled in the art will realize that other types of microphones are possible.

Specifically, the ear mountable device may comprise an inward-facing laser microphone 122 in order to realize an internal microphone. A laser microphone reflects a laser off a vibrating object and uses a receiver to capture the laser's reflection. The reflection of the laser gets deflected as vibrations shift the surface of the vibrating object. Therefore, if a receiver takes in the oscillating laser signal from a fixed location, the receiver will detect the laser deflections caused by the vibrations that were originally produced from an audio signal. The receiver can then filter and amplify this signal. An innovative embodiment uses an ear drum of the user as the vibrating surface and hence as the target for the laser. An embodiment uses a CivilLaser 780 nm 1 mW IR Low Power Laser Diode Module Dot Small Module 8 mm in combination with a RadioShack P722-5R cadmium-sulfide photocell for picking up the reflected light.

The ear mountable device may also comprise a cartilage conducting transducer 123. The cartilage conducting transducer serves the function of detecting vibrations which originate from sounds produced by the body, such as speech. Hence the transducer serves as a cartilage conduction microphone. The cartilage conduction transducer 123 may be coupled to a portion of the back of an auricle of an ear 124 of a user. In cartilage conduction, a sound transducer may also be placed on the cartilage of the pinna, whereby the air-conduction and osseotympanic bone conducting components are also transmitted. The vibrating surface often contacts not only with the aural cartilage but also with the osseous parts of/around the pinna. Other placements against cartilage tissue on or in the vicinity of an ear are possible. An embodiment uses a Sonion Voice Pickup Bone Sensor (VPU) sensor for realizing the cartilage conducting transducer 123.

The ear mountable device may comprise a bone conducting transducer 125. The bone conducting transducer 125 may be brought into contact with the temporal bone in a position behind the ear at a location where a lack of hair growth permits a direct contact of the transducer with the temporal bone. In embodiments with a head clamp 124 pressure exerted by the head clamp may be used to bring the bone conducting transducer 125 into contact with the user's skin in the area of the temporal bone. An embodiment uses a Sonion Voice Pickup Bone Sensor (VPU) sensor for realizing bone conducting transducer 125.

In an alternative embodiment a bone conducting transducer 126 may be brought into contact with the user's skin in the area of the temporal bone by attaching the transducer to the skin-facing side of the temple tips 127 of smart glasses 128. The inventors have found it useful to integrate the temple tips 127 with the overall frame of the smart glasses 128 in such a way that the temple tips are made of a flexible material and wherein the temple tips, when not worn, protrude inwards into what would be the temple area when worn. The intended result is that the temple tips will need to be flexed away from the temple area when worn. Flexing the temple tips away from the temple when putting on the smart glasses results in the temple tips exerting pressure on the temple area. This pressure is essential for the bone conducting transducer 126 to be operable. It is important that the pressure is not too strong, such as to cause discomfort to the user and yet strong enough to permit a snug fit of the transducer 126 with the user's temple area. In order to achieve the snug fit, embodiments have been constructed using plastic, nylon and combination materials for the frame of the eyeglasses, including the temple tips. The two commonly used plastic frame materials are zyl and propionate. Zyl, also known as cellulose acetate, is the most commonly used plastic frame material. Propionate is the second most common materials and is a nylon-based, hypoallergenic plastic. Gliamides and Grilamid is also a suitable material for embodiments of the eyeglass frame and temple tips. It is typically made of a high-quality thermoplastic material that is shock-resistant, lightweight, and non-allergenic. It provides structural integrity and stability that is very resistant to hot, cold, and chemical damage. Also suitable for practicing the invention are combination frames which help to get the best of various materials with frames that combine metal with the thickness of plastic. The list of materials is non-exhaustive, any material which is suitably flexible to exert the required pressure in order to press the transducer to the user's skin can be used in alternative embodiments. The smart glasses 128 may also comprise a front facing camera 129 suitable for observing the field of view 132 of the user within the visual range. The front facing camera 129, in one embodiment, was a H.264 camera with 1920×1080 pixels at 25 fps. The smart glasses 128 may also comprise eye tracking capability. In an embodiment eye tracking has been realized with an eye tracking unit 130, comprising both a eye camera and an infrared eye illuminator. In an example embodiment Tobii Pro Glasses 3 have been used as the basis for smart glasses 128. In an embodiment the Tobii Pro Glasses 3 has been enabled for wireless connectivity 115 using a Bluetooth LE adapter realized as a Pluggable USB Bluetooth 4.0 Low Energy Micro Adapter. By using the Tobi Pro Glasses 3 basis a smart glasses frame is provided which realizes camera 129 with a scene camera with a wider field of view (106° H: 95°, V: 63°) and which also realizes the eye tracking unit 130 with 16 illuminators and 4 eye cameras integrated into the lenses 131.

Figure 2:
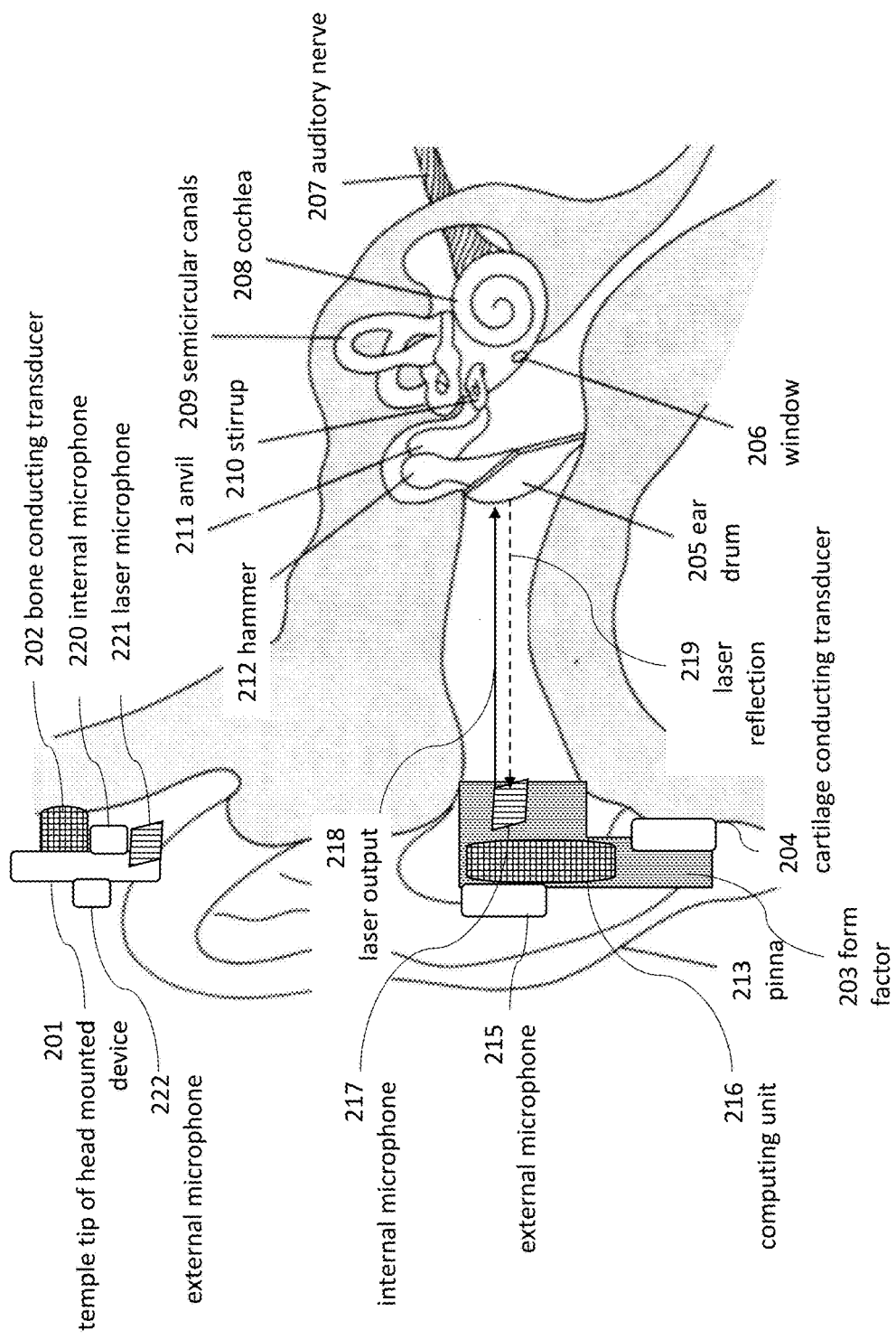
FIG. 2 illustrates a schematic view of an embodiment of the invention.

FIG. 2 depicts a side view of an exemplary embodiment with particular emphasis on the integration and interaction of the embodiment with the human anatomy around the skull area. 201 depicts a cross-section of the temple tips of a head mountable device or smart glasses. The temple tips 201 may have an integrated bone conducting transducer 202 which is pressed against the user's skin by pressure exerted through the frame of the head mountable device, of which the temple tips may be an integral component. The ear mountable device comprises a form factor 203 which houses the functional components and which may also be molded for a snug fit with the anatomy of the ear canal and the ear area of a user. The form factor may either be inserted into the ear, being held in place by the snug anatomical fit itself. In a preferred embodiment, a head clamp may be used to ensure a close fit. The prior art knows a wide variety of different types of head clamps, such as those being commonly used for headphones of all types. 204 is a cartilage conducting transducer which may be pressed against the user's skin either by the snugly fitting form factor itself, or alternatively by a clamp, such as a head clamp of the headphone type, which may be applied to the form factor. The temple tips 201 may comprise an external microphone 222 and an internal microphone 220 whereby external signifies in this context that the direction of the microphone is away from the user and internal signifies that the direction on the microphone is pointing towards the user. The combination of an external and internal microphone in the temple tips has the advantage that noise originating from the user can be filtered through noise cancellation algorithms. The temple tips may also comprise a user-facing laser microphone 221 configured to pick up telltale oscillations which may be associated with silent speech from the skin around the temple area of the user's skull.

The figure also depicts the human anatomy of the ear area, namely ear drum 205, the window 206, the auditory nerve 207, the cochlea 208, the semicircular canals 209, the stirrup 210, the anvil 211, the hammer 212 and the pinna 213.

The form factor 203 may comprise an internal microphone 217 and an external microphone 215. The internal microphone is facing toward the ear canal of the user, when the form factor is worn; whereas the external microphone is normally facing away from the ear canal. An innovative departure from the prior art is constituted through using inward and outward facing microphones, enabling active noise cancellation regarding noises originating from the outside world, i.e. outside the body of user. Since one aim of the invention is the detection of silent speech, i.e. speech inaudible for the outside world it is useful to cancel noise from the outside world. Noise cancellation algorithms may be executed through computing unit 216, wherein a computing unit may comprise one or more processors, a transceiver, communication interfaces and data storage. In a preferred embodiment the internal microphone is an inward-facing laser microphone whereby the laser output may be directed towards the ear drum 205, causing a laser reflection 219 to be returned to the laser microphone. In other embodiments non laser-based microphones were used for the internal microphone, such as microphones which use built-in membranes or other moving parts as intermediaries between the incoming acoustic and the resulting electrical quantity.

Figure 3:
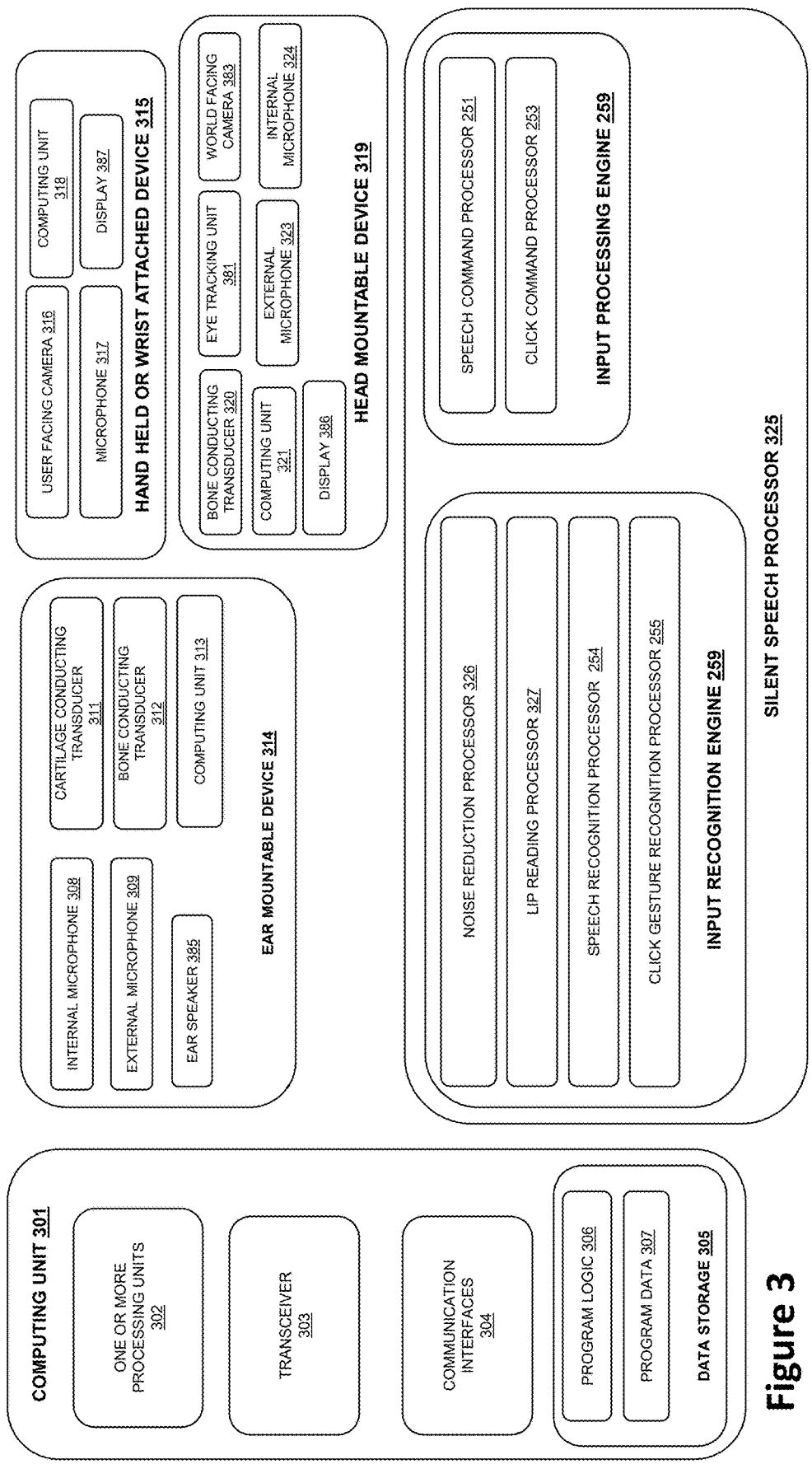
FIG. 3 illustrates an architectural overview of an embodiment of the invention.

FIG. 3 depicts an overall system diagram of a preferred embodiment of the present invention. The system may comprise one or more computing units 301. A computing unit may be integrated with a wrist-attached device 101, a handheld device 102, an ear-mountable device 118 and a head-mountable device 128. A computing unit may comprise one or more processing units 1110 which can either constitute a shared resource, or especially if performance-critical tasks are performed, separate processors can be added to the singular components. The preferred embodiment further may comprise one or more communication interfaces 304. In a preferred embodiment each system component which in integrated with its own computing unit comprises at least one Bluetooth LE communication interface for letting the system components network with each other and the overall system comprises at least one wireless local area network (WLAN) and one Global System for Mobile communication (GSM) communication interface for enabling communications beyond the system boundaries.

The system may comprise one or more transceivers 303, wherein said transceivers may perform the function of enabling wireless connections between the components themselves and with the wider world, such as to access cloud services. The transceivers in the preferred embodiment may comprise Bluetooth transceivers, wireless local area network transceivers and a GSM transceiver, however those skilled in the art will appreciate that any combination of wireless transceivers will suffice for enabling an embodiment of the present invention. A preferred embodiment comprises data storage 305. Data storage may be used to store both program logic 306 and program data 307 for execution on the processing units 302.

A preferred embodiment comprises two ear mountable devices 314, one for each ear. The invention, however, may be practiced with only a single ear mountable device also. An ear mountable device may comprise an internal microphone 308, an external microphone 309, a cartilage conducting transducer 311, a bone conducting transducer 312, an ear speaker 385 and a computing unit 313.

In an exemplary embodiment the ear speaker 385 was realized with a PHONSUN Earpiece Ear Speaker. In embodiments of the invention the ear speakers have been utilized to output text-to-speech in speech-to-text-to-speech type use cases which are useful for hearing aid type applications, i.e. when the speech of a by standing person is being recognized, aided by viseme recognition, transcribed to text and subsequently output as synthetic speech through the ear speaker.

In alternative hearing aid type embodiments, recognized speech may be output as text on a subtitle type of display on a paired device, such as an augmented reality type retinal projection display or the display of a smartphone type device, such as the display 386 of the head mountable device 319 or the display 387 on the hand-held or wrist-attached device 315.

The system may comprise one or more handheld or wrist attached devices 315. A handheld or wrist attached device may comprise a user facing camera 316, a microphone 317 and a computing unit 318.

The system may comprise a head mountable device 319 which is realized by a smart glasses type device 128 in a preferred embodiment. The head mountable device may comprise a world-facing camera 383, an eye tracking unit 381, a bone conducting transducer 320, a computing unit 321, an internal microphone 323 and an external microphone 324. The internal microphone is realized as a laser microphone in a preferred embodiment, wherein the constituent laser may be configured to pick up oscillations of an area of skin of the user's head.

The system may comprise a silent speech processor 325. The silent speech processor may be a distributed processor in such a way that the associated program logic may be executed on more than one device and that the results may be aggregated from more than one device. There are also embodiments which use cloud computing in the sense that some of the program logic of the silent speech processor may be executed on one or more cloud computing servers. The silent speech processor may comprise a noise reduction processor 326 for reducing ambient noise and thus enhancing acoustic signals originating from the body of a user. The silent speech processor may use a digital signal processor (DSP) to adapt the noise cancellation to the specific environment.

The system may comprise a lip-reading processor 327. A lip-reading processor may take a video stream of the user's mouth area, or general face area, as input and transcribe speech, including silent speech. In a preferred embodiment the lip-reading processor has been implemented using a TITAN X GPU, CUDA and the TensorFlow deep learning framework. The NVIDIA CUDA Toolkit provides a development environment for creating high performance GPU-accelerated applications. An output of the lip-reading processor may be a stream of recognized visemes, wherein the recognized visemes may be an input to the phoneme disambiguation step during subsequent speech recognition by the speech recognition processor 254.

The system may further comprise a speech recognition processor 254. A preferred embodiment was using a 14-nm inference chip leveraging 34 large arrays of phase-change memory (PCM) devices, digital to analog input, analog peripheral circuitry, analog to digital output and massively parallel-2D-mesh routing. The described embodiment implemented the MLPerf version of RNNT, a large datacenter network, on Librispeech without any additional hardware-aware retraining. This model has 45 million weights, which we implement using more than 140 million Pulse Code Modulation (PCM) devices across five packaged chip modules. PCM devices are responsible for converting digital sound sequences to analog waveforms, or analog waveforms to digital sound sequences.

The system may further comprise a click gesture recognition processor 255. Click gesture recognition requires analyzing data stream from sensors such as bone conducting transducers, acoustic microphones or laser microphones. Such data streams need to be search for patterns resembling a click gesture input. Pattern matching is a fundamental concept in computer science that involves checking a given sequence of tokens for the presence of the constituents of some pattern. Embodiments of the invention employ pattern recognition using neural. Neural networks are based on parallel subunits referred to as neurons that simulate human decision-making. A preferred embodiment is using neural networks with deep learning, which applies deep convolutional neural networks (CNN) to solve classification tasks. The recent advances in hardware have led to the emergence of Graphical Processing Units (GPU) as a solution for speeding up the process of executing complex deep learning algorithms. Although GPU offers massive parallelism through a large number of cores, it is not always the optimum choice for executing training of all deep learning models. A preferred embodiment of the click gesture recognition processor uses a CPU because performance tests for click gesture recognition using CNN have indicated that the CPU trains up to 2 times faster than the GPU.

An embodiment may comprise an input processing engine 259, which in turn may comprise sub-components comprising a speech command processor 251, a click command processor 253, and a speech recognition processor 254. An embodiment of the speech command processor 251 was implemented using NXP Voice Intelligent Technology (VIT) Wake Word and Voice Command Engines which are free, ready to use voice UI engines. They enable customer-defined wake words and commands using online tools. The NXP library and voice control software package is delivered via the MCUXpresso SDK or Linux BSP. A click command processor 253 was also implemented using the MCUXpresso SDK, whereas an embodiment was mapping a detected click gesture or click sound to a wake word.

Figures 4, 4A:
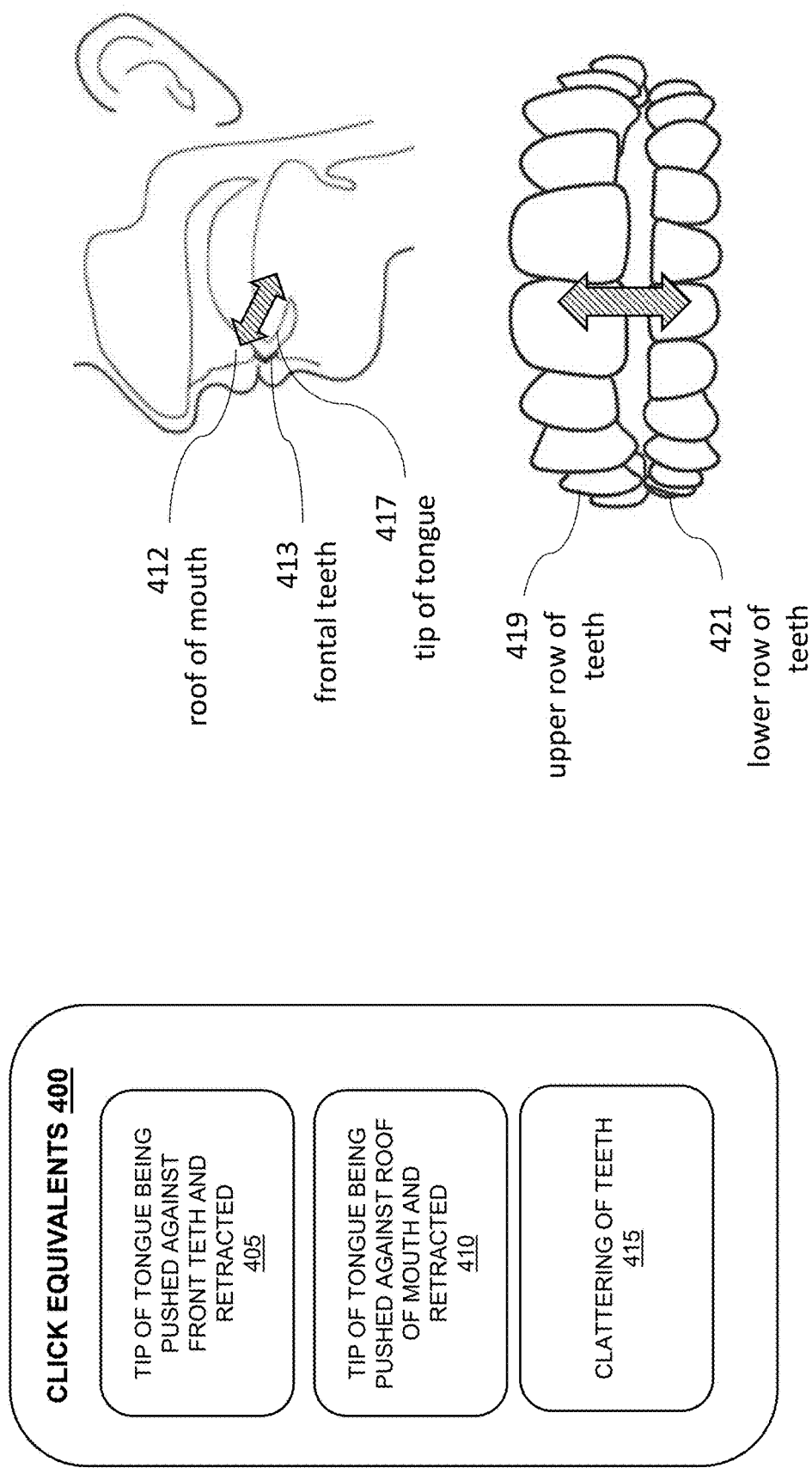
FIG. 4 illustrates a schematic overview of click equivalents for an embodiment of the invention.
FIG. 4A illustrates a physiological overview of actions required for performing click equivalents for an embodiment of the invention.

FIG. 4 and FIG. 4A describe embodiments wherein novel click equivalents 400 are utilized. In an innovative departure from the prior art, Applicant has realized that the tip of the user's tongue 417 being pushed against the front teeth 413 and then being retracted 405 may serve as a semantic equivalent to the mouse click type user command known in the prior art. Alternatively, the user's tip of the tongue 417 may be briefly pushed against the roof of the user's mouth 412 and then being retracted 410. Another embodiment may comprise interpreting a clattering of teeth 415 as a click equivalent, whereby of clattering of teeth may be defined as bringing an upper row of teeth 419 together with a lower row of teeth 421 in such a way that a faint noise is produced. Such a noise is normally too faint to be detectable by a third person human observer, such as a bystander. However, such a noise is normally detectable both by sensitive microphones, such as which are described for embodiments of the instant specification, and also by the user themselves. The user typically being able to sense such body internal sounds, even in noisy environments, offers the advantage of a sensatory feedback look, which in turns aids to improve precision of inputs. The inventor has realized that these embodiments offer the added advantage of being relative fatigue free, as compared with repetitive strain from finger movements, as may be the case with the risk of repetitive strain injury arising from finger movements which are required for prior art type mouse click inputs. Moreover, these types of described click equivalents have the advantage that they are also precise, especially on a measure of timing. However, it is possible that involuntary click equivalents are detected, such as an involuntary clattering of teeth, or an involuntary touching of teeth, or the roof of the mouth with the tongue. In such cases, embodiments practice a contextual evaluation in order to be able to distinguish between involuntary and voluntary click equivalents. In an embodiment such a context evaluation comprises determining whether a pointer, such as a mouse pointer, rests atop a clickable surface of a user interface when such a click equivalent is detected.

Figure 5:
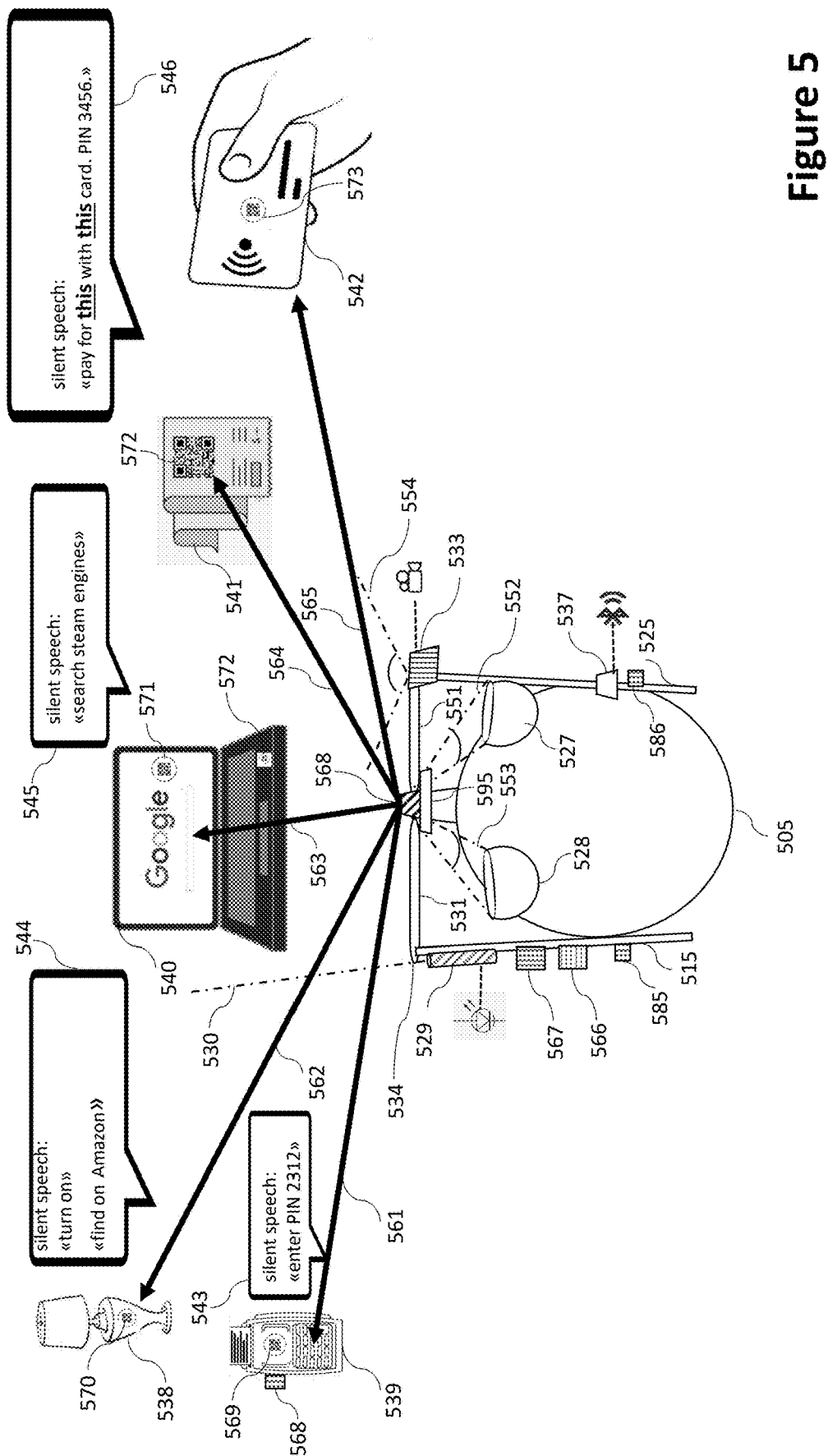
FIG. 5 illustrates a schematic overview of use cases for an embodiment of the invention.

FIG. 5 is a schematic diagram depicting several use cases for an embodiment comprising a head wearable device. A user 505 may wear smart glasses which may comprise a head wearable frame 515, wherein the frame may comprise a left lens 531 for a left eye 528 and a right lens 551 for a right eye 527. Attached to the frame or alternatively embedded therein, or alternatively connected wirelessly or by wire, may be a silent speech processor 566 and a computing unit 567. Attached to the frame may be a light emitting device 529, wherein said light emitting device may be configured in such a way that emitted light is directional and wherein emitted light is directed towards the direction 530 where the user's head is pointing. A preferred embodiment is using a laser diode with light of the near infrared spectrum. Other light emitting devices and wavelengths other than near infrared are possible. However, in all embodiments it is desirable that the light emitting device emits as narrow a beam as possible and that the light is invisible to the human eye.

Attached to the frame, or integrated therein, may be a left microphone 585 and a right microphone 586. The left and right microphones are directional microphones, configured in such a way that sound is picked up primarily from a specific direction, wherein the left microphone may pick up sound originating from directions to the left side of the device and wherein the right microphone may pick up sound originating from directions to the right side of the device. It is possible to alternatively use an omnidirectional microphone as a directional microphone by installing it in such a way that sounds from directions other than the preferred direction are reduced by sound-absorbing obstacles. Exemplary embodiments have used Sanskrit AN-300 directional MEMS microphones for implementing the left and rights microphones. Alternatively, an array of microphones of more than two microphones may be used.

Attached to the frame, or integrated therein, may be an eye tracking unit 568. In a preferred embodiment, a Tobii Eye Tracker 5 was attached to the frame. The eye tracking unit is capable of determining a gaze direction from visually observing the user's eyes 528 and 527 by illuminating the eyes with a cone of light 552 and 553 and imaging the user's pupils. Other eye tracking implementations are possible. Also, it is possible that the eye tracker is external to the frame. If the eye tracker is external to the frame, embodiments use low power wireless communications, such as Bluetooth in a preferred embodiment, to allow the eye tracker to interface with the silent speech processor and the computing unit. Attached to the frame, or integrated therein, may be a wireless communications unit 525, which is a Microchip RN4870/71 Bluetooth Low Energy Module in one embodiment.

Attached to the frame, or integrated therein, may be a forward-facing video camera 533 which may be configured to image a field of view 554 essentially corresponding to the user's field of view. An embodiment was using the DesignSpark RP-VC1 camera module CSI-2 with 1920× 1080 pixels resolution.

Attached to the frame, or integrated therein, may be a display 595. In a preferred embodiment, a virtual retinal display was used. A virtual retinal display (VRD), also known as a retinal scan display (RSD) or retinal projector (RP), is a display technology that draws a raster display directly onto the retina of the eye. In one embodiment a QD Laser VRD RETISSA Display II was used.

One use case for a head mountable embodiment is the touchless entry of a PIN number into a point of sale (POS) terminal 539. The inventor has realized that it is desirable to enter a PIN number in such a way that it is essentially both unobservable to outside observers for privacy reasons and touchless for hygienic reasons. The described use case starts with a customer in shop approaching the POS terminal and making eye contact with it. With eye contact being established, an interfacing between the user and the POS terminal is then automatically initiated. In one embodiment the light emitting device 529 is signaling to the POS via modulated light and wherein the POS terminal comprises a light receptor unit 568. In other alternative embodiments, the eye tracker 568 in combination with the forward-facing camera 533, determines that the user has made eye contact with the POS terminal 539. The said determination is aided if a visual code, such as a bar code or a QR code is being displayed, or alternatively being attached to the POS terminal casing as a sticker, or alternatively being printed on the POS terminal casing. Said visual code serves as an aid for identifying the POS terminal and once a POS terminal has been identified, then an address for said POS terminal may be determined. A possible address would be an Internet-accessible web service, such as a REST endpoint for example, with a unique identifier for said POS terminal. Once the POS terminal is addressable, either through transmitting modulated light to it, or alternatively by addressing it through an Internet-centric communication protocol, then embodiments may transmit the required PIN number. As a first requirement of all embodiments, the PIN has to be communicated by the user, using silent speech 543. Thus, the user is miming the typical lip movements that would be required for speaking the PIN number aloud, but the user is taking care that no sound is being produced which would be loud enough to be overheard by bystanders. So, either no sound is produced at all, which implies miming of speaking, or alternatively sound is reduced to an inaudible volume, such as whispering. Once the silent speech processor has detected a PIN number silent speech input it is transmitted to the POS terminal which has been detected in the first step. Transmission may be either direct to the POS terminal on an optical path via modulated light through the light emitter 529 or via said acquired address, typically though a REST endpoint via the Internet or via a localized Bluetooth connection directly between the head-mountable device, or a secondary device (such as a smartphone) electronically paired with the head mountable device. After input of a PIN number, a click equivalent, such as detailed in FIG. 4 may be used to confirm the input.

In another use case, a user of the head mountable embodiment may direct their gaze at an arbitrary object 538 in their field of view. By combining data received from the eye tracker 568 and the front-facing camera 533 the embodiment is capable of determining a generic type of object, such an item of merchandise, for example the depicted lamp 538, or alternatively to identify a specific object, such as a landmark or monument. In a preferred embodiment the user makes a silent speech command 544 such as "turn on" or "find on Amazon" whilst dwelling their gaze on the object, which may be followed by transmitting image data to an image-based search service, such as Google's Search by Image search service for example. The general steps that Search by Image takes to process a submitted image are:

(a) analyze image: The submitted image is analyzed to find identifiers such as colors, points, lines, and textures.

(b) generate query: These distinct features of the image are used to generate a search query.

(c) match image: The query is matched against the images in Google's back end.

In a preferred embodiment the top result from the "match image" step is then taken as the context for executing the silent speech command. So to follow through the given example, the user dwells their gaze on a lamp, which is followed by Google Images determining that the lamp is probably a particular model of lamp from a particular manufacturer, for example an "ACME model 7/11 lamp". Therefore, the silent speech command "find on Amazon" is, in the context of this example, interpreted to mean "find [an ACME model 7/11 lamp] on Amazon [and show the query results on the paired screen device]". An alternative use case would be the silent speech query "what is this?" and the output would be synthetic speech on a paired earphone device, speaking "an ACME model 7/11 lamp".

When dwelling a gaze on an object, another use case of the invention is to cause an action of a specific object. It is important to note that the object does not need to be a paired, or previously known object, as would be the case in home automation. In the depicted example the lamp in question is a lamp which the user has not previously acquainted with, for example a lamp at a restaurant table. In the example the lamp is identifiable through a visual code, a QR code 570 in the example, which is picked up with camera 533. The embodiment may determine that the lamp is in the user's focus by deriving that the user's gaze is dwelling on the object. If, during a dwelling on the object, a silent speech command is uttered, such as "turn on", then the computing unit 301 may be configured to send the command as text to a web service whereby the object identifier which has been learned from the OR code is included as an argument. After uttering a command phrase, a click equivalent, such as detailed in FIG. 4 may be used to confirm the input.

In another use case an embodiment may use silent speech to enter data into a graphical user interface of a personal computer, such as depicted at 540. The personal computer may be paired with the head mountable device, or alternatively the personal computer may be unpaired, but a visually detectable identifier is displayed 571 or attached to the personal computer or printed on the personal computer 572. In case of pairing a silent speech utterance such as "search steam engines", for example, may be entered directly as text into an input capable field on the user interface, provided that the user's gaze 563 is dwelling on the said field. In an unpaired use case, first a visual identifier has to be picked up by the front-facing camera 533 and then a pairing from the head mountable device to the personal computer may be initiated. After input of text into a field a click equivalent, such as detailed in FIG. 4 may be used to confirm the input.

In another use case a payment for goods or services may be accomplished by first directing the user's gaze to a visual code 572 which is linked to a request for payment. The visual code may be printed, for example, on a paper slip 541 which may be produced by a POS terminal, or the visual code. Alternatively, the visual code 572 which is linked to a request for payment may be displayed on a display screen by the POS terminal, or in fact any screen device capable of displaying a payment request. So, alternative use case may involve a payment request being displayed on the user's personal computer whilst online shopping. In a silent speech enabled payment workflow, the user's gaze dwell may change from the visual code for a payment request to a means of payment, such as a credit card 546. The means of payment may be identifiable by a visual code, such as a QR code 573, or the means of payment may be optically recognized, in the sense that an optical recognition search determines that a credit card is in the hand of the user and the optical recognition is capable of visually recognizing the credit card details. A time threshold may be settable which determines an allowable time window in which the dwelling on the request for payment 564 and the dwelling on the means for payment 565 have to occur in order for a link between the payment request and means for payment to occur. Also, an explicit payment order may be made by silent speech, for example by making the utterance "pay for this [gaze dwell on payment request] with this [gaze dwell on credit card]. PIN 3456." 546. A payment order may be explicitly confirmed by a click equivalent, such as detailed in FIG. 4.

Figure 6:
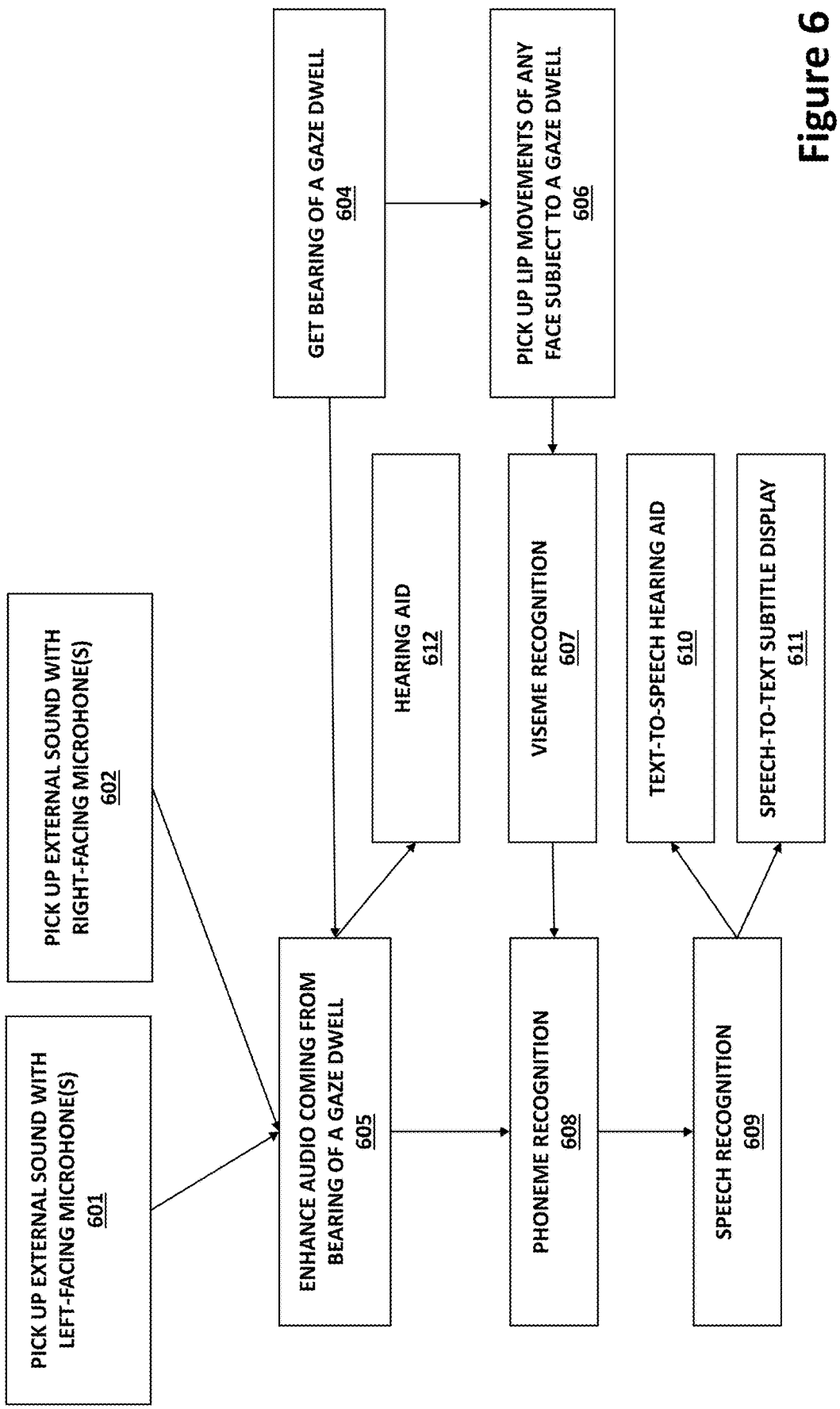
FIG. 6 is a flow diagram for an embodiment of the invention, illustrating a flow of inputs and intermediate steps, resulting in a plurality of output options.

FIG. 6 depicts a flowchart of an embodiment useful for improved speech recognition precision. The use case is recognizing speech made by a third person, whereby this third person is visually observable. In a preferred embodiment a user is wearing a head mountable device, such as specified in FIG. 1, and the user is able to observe the third person with said head mountable device. A longstanding problem in the art is the difficulty to achieve reliable speech recognition in a noisy environment. Particularly in noisy environments, such as a party or a nightclub, it can be very difficult to communicate with other people due to the general ambient noise levels and the circumstance that people sometimes tend to talk over one another. This is a problem which is particularly severe for people who are hard of hearing due to hearing loss. Embodiments of the invention have solved this problem by combining acoustic speech recognition with visual speech recognition techniques, such as lip reading. Moreover, by combining speech recognition with eye tracking techniques, it becomes possible to identify which of the available speech sounds is of interest to the user and to filter out the overlaying other speech sounds. This is something why conventional hearing aids are unable to achieve because they have no knowledge of where the user is looking at and hence they are not able to discriminate individual speakers when speech is overlayed by different speakers.

This described effect may be achieved by picking up sounds with a plurality of at least two microphones. A preferred embodiment picks up sound with a left-facing microphone 601 and a right-facing microphone 602. In a preferred embodiment the left-facing microphone is located near the left ear of the user of a wearable device and the right-facing microphone is located near the right ear of a user of the device. By using eye tracking capability, the system is capable of determining eye contact with user facing camera(s) and world-facing camera(s) 603. Eye tracking allows the system to determine where the gaze of the user is dwelling. Front-facing cameras allow the system to image the area of gaze dwell. The imaged area may then be subjected to image analysis, in particular to object recognition. If the object recognition determines that a human face is being imaged, and that in particular the eye area of the human face is the subject of gaze dwell, then the system may deem that eye contact has been made with a potential speaker. Once an eye contact has been detected, then as a next step a bearing from the speaker to the potential speaker can be calculated. Certain embodiments have found it useful to express the bearing of the eye contact as the angle between the looking-straight-ahead direction of the user's head and the line going from the user's head to the center of the detected speaker's head.

In some embodiments the bearing of a gaze dwell 604 is used for audio enhancement. A gaze dwell is detectable by the eye tracking unit 381. The eye tracking unit is capable, either directly or indirectly, of providing a bearing towards a gaze dwell.

A dwell time may be used to quantify the amount of time that a user has spent looking at a particular real word object. A gaze dwell is hence defined as having occurred when a user spends an amount of dwell time, in excess of a set threshold, dwelling their gaze on a real-world object, during a set interval of time. Embodiments of the inventions have used the time spent looking a an interlocutor's face as the basis for determining whether the interlocutor is subject to a gaze dwell.

A long duration of looking at a certain region can indicate a high level of interest, while shorter duration times can indicate that other areas on the screen or in the environment might be more interesting.

With an array of microphones picking up sounds in different locations, or alternatively directional microphones, it becomes possible to selectively amplify sound coming from a certain direction, or alternatively to suppress or filter sound coming from other directions. Thus, with step 605 speech coming from the bearing of the bearing of the eye contact can be isolated, in the sense that sound coming from this bearing is amplified and/or enhanced and/or sounds coming from other bearings are being suppressed. The resulting sound is capable of being fed back to the user's earpiece as audio, such as is the use case for a novel type of hearing aid 612.

To accomplish the task of isolating speech sound coming from a particular direction, in this case the direction of the gaze dwell, arrays of multiple microphones are often used to create a directional beam that can point to a specific person and isolate their voice. The more directional the beam, the more the background noise is rejected, resulting in better isolation of the person's voice. It is possible to replace the multiple omnidirectional microphones in a traditional array with multiple directional microphones. For example, a 2-microphone omnidirectional broadside array can be replaced by a broadside array of 2 directional microphones. Likewise the broadside beamformer, an alternative 2-microphone omnidirectional endfire array can be replaced by an endfire array of 2 directional microphones. When using omnidirectional microphones in arrays, there is a fundamental tradeoff between signal to noise ratio (SNR) and directivity. If a high SNR is needed, a broadside beamformer can be used with limited directionality. Otherwise, for applications with substantial noise or reverb, a differential endfire beamformer can be used to provide more directionality, at the expense of reduced SNR and thus audio quality. Further, due to aliasing effects, only a limited bandwidth of directionality can be achieved. Exemplary embodiments have used two Sanskrit AN-300 directional microphones to realize microphones 585 and 586.

Unlike traditional omnidirectional microphones, directional microphones have two sound ports. In an exemplary embodiment each sound port was coupled to a sound port in the casing of either the ear-mountable device or in the head-mountable device. In a preferred embodiment the through-hole sound port configuration was used since it provides the best directional microphone performance compared to the alternative V-configuration or L-configuration of sound ports.

In order to isolate a source of speech at a given bearing, coinciding with the direction of a gaze dwell, from signals received from the array of microphone, a step sound processing may be required. Exemplary embodiments have used techniques for beamforming, whereas beamforming is the art of separating sounds according to their direction of incidence. Separation of signals along distance was not attempted for the preferred embodiment and, therefore, beamforming can consider a simplified form of Eq. (1) by removing the terms related to the sound source distance. Alternatively, a reference distance $r_{ref}$ can be used as long as this is large compared to the sound source wavelength.

$$p_{mic}(k, \vec{r_{sc}}) = p_{src}(k) \sum_{n=0}^{\infty} (2n+1) \frac{h_n(kr_{src})}{h'_n(kr_{mic})} P_n\left(\frac{\vec{r_{mic}} \cdot \vec{r_{src}}}{|\vec{r_{mic}}||\vec{r_{src}}|}\right) \quad \text{(Eq. 1)}$$

In Eq. (1), $p_{mic}$ stands for the sound pressure observed at a point $\vec{r_{mic}}$ on the rigid sphere. A single point source of amplitude $p_{src}$ is assumed to be located at $\vec{r_{src}}$. Functions $h_n$ and $P_n$ are, respectively, the spherical Hankel functions and the Legendre polynomials, both of order n. Primed symbols are used to denote function derivatives.

A simple approach to beamforming is to consider a desired directivity pattern $D(\theta, \phi)$. The target directivity is sampled at a representative set of angles and the sound pressures expected to be observed at each of the microphones due to a sound source at each of the sampled directions is calculated. The recordings for all microphones can then be combined into a single signal approximating the target directivity using Eq. (2).

$$P_{beam} = [D_1 \ D_2 \ \ldots \ D_a] \begin{bmatrix} p_{1\to1} & p_{2\to1} & \cdots & p_{a\to1} \\ p_{1\to2} & p_{2\to2} & \cdots & p_{a\to2} \\ \vdots & \vdots & \ddots & \vdots \\ p_{1\to b} & b & \cdots & p_{a\to b} \end{bmatrix}^{+} \begin{bmatrix} p_1 \\ p_2 \\ \vdots \\ p_b \end{bmatrix} \quad \text{(Eq. 2)}$$

In Eq. (2) a total of a sample directions $[D_1 \ D_2 \ \ldots \ D_a]$ are sampled using an array of b microphones. In a preferred embodiment exactly 2 external microphones are used. The actual microphone recordings are represented by $p_1, \ldots, p_p$, while the ideal sound pressure expected at a given microphone i in the presence of a single sound source at direction j is written as $p_{j \to i}$. This is calculated using Eq. (1) or its plane-wave equivalent. The symbol $|\cdot|^+$ denotes a matrix inversion, typically a pseudoinverse.

Conventional beamforming using a single microphone array can isolate sounds that originate from a given direction. It, however, cannot separate multiple sources when they are aligned. The problem is hard to overcome since compact arrays can only sample the sound field from a single viewpoint. It is possible, however, to use multiple compact arrays, that is, an array—of arrays to isolate sounds originating from a specific position in space. The preferred embodiment is not affected by this restriction, since a bearing to the speaker is derived from the detected gaze dwell. Hence distance to the speaker is not a factor for this embodiment. Other exemplary embodiments, however, are configured to derive not only a bearing, but also a distance from to interlocutor's face which is subject to a gaze dwell. Once the distance is known, then it becomes possible for these embodiments to isolate the speech of one speaker, even if there are other speaker are positioned in essentially the same bearing, but at different distances.

In a different use case, the enhanced audio which is coming from the bearing of the gaze dwell 605 is subsequently fed into a dual source phoneme recognition step, whereby the second source is a feed of probable phonemes which have been detected by a viseme recognition step 607.

Step 606 may thus pick up lip movements of any face which is the subject of a gaze dwell by the user of the device. Once a bearing to a gaze dwell has been detected, then an image analysis from an image captured by the world-facing camera may yield a face having been detected in the direction of the gaze dwell. In order to detect faces, embodiments have used the face-recognition 1.3.0 Python library using dlib's face recognition built with deep learning. The model has an accuracy of 99.38% on the Labeled Faces in the Wild benchmark. Other face recognition algorithms may be used alternatively.

The viseme recognition step 607, in turn is preceded by step for picking up lip movements of the speaker who is being identified by a face being visually detected in direction of the bearing of a gaze dwell, whereas the gaze dwell may be detected in the preceding step 604. Thus, the phoneme recognition step is novel, in part, because phoneme recognition is both audio-derived and visually disambiguated with visemes derived from the lip movements of an algorithmically detected speaker. Phoneme recognition 608 may be followed by a speech recognition step 609, which is the step where language modelling is applied to translate the sequence of phonemes into text. The resulting text, in turn, may be translated to speech which may then be fed into an earpiece worn by the user, such as is the use case for a text-to-speech hearing aid 610, i.e. a novel type of hearing aid, whereby the user primarily hears audio resulting from synthetic speech of a speaker whereby the speaker has been determined to be the subject of a gaze dwell and whereby the speech from the speaker has undergone at least one cycle to speech-to-text and text-to-speech digital processing.

Hence a text-to-speech hearing aid would be characterized by the steps of: recognizing a speech made the subject of the detected gaze dwell in such a way that the speech is transcribed into text, performing a text-to-speech conversion of said text, wherein said conversion is resulting in a synthetic speech and outputting said synthetic speech on a wearable device, wherein said wearable device is worn by said user.

In another use case, an embodiment may display the resulting text from the speech recognition step 609 visually. In a preferred embodiment, the speech uttered by a speaker who is subject to a gaze dwell is displayed as subtitles 611 on a display which is integrated with the head mountable device.

Hence a subtitle type of hearing aid may be characterized by the following steps: recognizing a speech made the subject of the detected gaze dwell in such a way that the speech is transcribed into text and outputting said text on a subtitle display in augmented reality.

Figure 7:
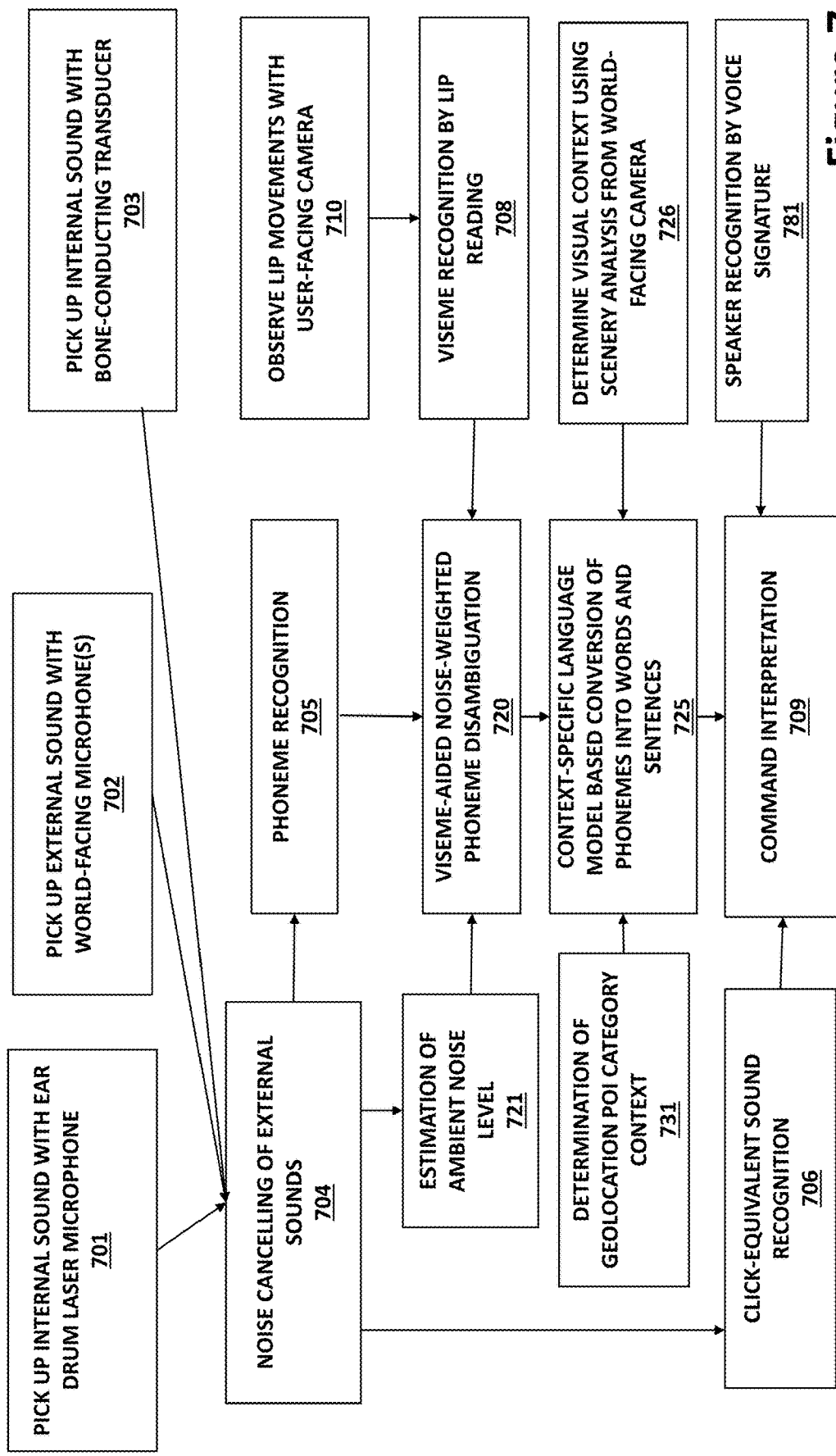
FIG. 7 is a flow diagram for an embodiment of the invention, illustrating a flow of inputs and intermediate steps, resulting in a command output.

FIG. 7 details another use case of embodiments of the present invention. In the flow chart of FIG. 7 sounds are being picked up with a plurality of microphones, either microphone in different locations and/or directional microphones. The embodiments may comprises microphones configured for picking up body-external sounds and microphones configures for picking up body-internal sounds, whereby the body-internal sounds are those which are relevant for the silent speech signal and body-external sounds are noise which needs to be filtered in order to reveal the silent speech signal. In one embodiment internal sounds are picked up with an ear drum laser microphone 701 and/or a bone conducting transducer 703 whilst external sounds are picked up with one or more world-facing microphones 702. By having separate audio feeds of internal and external microphones, the external sounds are able to be subjected to noise cancelling 704, which leaves the internal sounds as the signal whilst suppressing the external sounds. From the noise-cancelled internal sound audio feed a step of phoneme recognition 705 may be executed. The result of the phoneme recognition step may be ambiguous in the sense that there may me a plurality of possible phonemes at any given time and that a disambiguation is necessary in subsequent steps. The inventor has realized that as an inventive departure from the prior art it is desirable to augment audio-based phoneme recognition with a novel type of viseme recognition. Visemes are the visual equivalent of phonemes. Although not precisely defined in the art, the inventors have adopted a working definition of a viseme being a set of phonemes which have identical appearance on the lips. Therefore, a phoneme maps to exactly one viseme but a viseme may represent many phonemes: a many to one mapping. In order to be able to perform visual phoneme recognition lip movements of the user have to be picked up by a user facing camera in one step 710. In the next step viseme recognition by lip reading 708 is performed. Following the noise cancellation step 704 it becomes possible to estimate the general level of ambient noise 721. Ambient noise may be estimated by comparing a baseline of the volume of the external sound to a baseline of the volume of the internal sound. Other methods of estimating a level of ambient noise are known in the art. Next may be a step 720, a viseme-aided noise-weighted phoneme disambiguation, taking as input an estimation of noise level from step 721 and a stream of recognized visemes 708. Step 720 may make use of pre-configured viseme-to-phoneme mapping tables to determine whether a phoneme detected at a point on the time axis is compatible with the viseme detected at the same time. If it is not compatible, then the system may check whether another candidate phoneme is compatible the detected viseme. As a result, there may be a plurality of phonemes which are compatible with the detected viseme at any given time. The system may choose to given either the visual phoneme disambiguation (i.e. viseme based) or the audio based phoneme disambiguation greater weight, based on an estimation of noise. Increased weight may hence be assigned to visual-based phoneme recognition over audio-based phoneme recognition when the ambient noise level increases. In a very noisy environment, a higher weight may be given to viseme-based disambiguation, which is because phoneme recognition is more unreliable in noisy environments, whereas noise is not a factor in viseme detection. Hence the noisier the environment the less weight may be given to audio-based phoneme disambiguation and the more weight may be given to visual-based phoneme disambiguation.

Next may be a step of context-specific language model-based conversion of the disambiguated phonemes into words and sentences 725 with a novel combination of input from both a determined geolocation context 731 and a determined visual context using scenery analysis from one or more word-facing cameras 726. The visual scenery analysis may be performed using an imaged based search of video stills from a world-facing camera, such as interfacing via a web service the automatic image description feature called Get Image Descriptions from Google in one embodiment. Such embodiment may return a textual description of the real world scenery the user is immersed in. As an example, the user may be standing at a market stall and the textual description received from the web service may be "Fruits and vegetables at the market". A keyword matching may be performed in step 725, whereby a match may be found with a context-specific language model "fruits and vegetables" or "market", for example.

Hence a context-specific language model may be found by capturing an image with a world-facing camera, querying an image description service for a textual description of said image, mapping the textual description to a category, and searching for a language model which is associated with said category. Concerning the mapping of a textual description to a category, this may be achieved by using a keyword lookup, wherein each category may be associated with one or more keywords. For example, if the textual description is "Fruits and vegetables at the market" and a category is "shopping", then there may be a lookup table which associated the category "shopping" with the keyword "market". Since the textual description comprises the keyword "market", an association may therefore be made between that textual description and the context-specific language model which is associated with the category "shopping". In order to practice the invention other methods known in the art may related to mapping an image to a category may be used also.

The context-specific language model may also be selected, in step 725, based on the detected geolocation. For example, if the geolocation of the user has been detected to coincide with the point of interest (POI) "McDonalds Restaurant, Mayfair, London, England", then a category matching with the POI category 731 may yield a context-specific language models, for example a "restaurant" POI category may match with a "restaurant" language model which may be a language model which is optimized for detecting language typically used when interacting with restaurant staff.

Hence a context-specific language model may be selected by determining a geolocation of a user, determining one or more points-of-interest at said geolocation, determining one or more categories of said points-of-interest and searching for a language model which is associated with one or more of these categories.

The recognized words and sentences from step 725 may subsequently be fed to the command interpreter 709. Also fed into the command interpreter may be an output from an optional speaker recognition step 781. In an exemplary embodiment a recognized silent speech command is only executed if the speaker can be authenticated via their voice signature. Such speaker identification may be text-independent, in the sense that there are no restrictions on what the speaker says in the audio. The speaker's voice may be recorded in an enrollment phase, whereby the voice features are extracted to form a unique voice signature for the user. In a speaker identification step, the input voice sample may be compared to a list of enrolled voices. In an exemplary embodiment the Microsoft Azure Speech Service was used to provide speaker-identification services. Other embodiments have used a visual speaker identification, as opposed to an audio-based speaker identification, such as when using a user-facing camera to identify the speaker using face recognition. It is also possible to use biometric speaker recognition. The inventor has realized that audio-based speaker identification, when coupled with silent speech may be the most secure way of issuing and authenticating a command in a crowded place. Other possible authentication methods suffer from the drawbacks that they may be either observable by malicious onlookers or interlocutors, or that it is unknowable if the input has been made by a live user, as would be the case with fingerprints, for example, which can simply be copied.

Also, the noise-cancelled stream of head-internal sounds 704 may be fed to a step of click-equivalent sound recognition 706, i.e. sounds made by touching the roof of the mouth or the front teeth with the tongue, or a faint clattering of teeth. These detected click-equivalent sounds may also be fed to the command interpretation engine in step 709.

Figure 8:
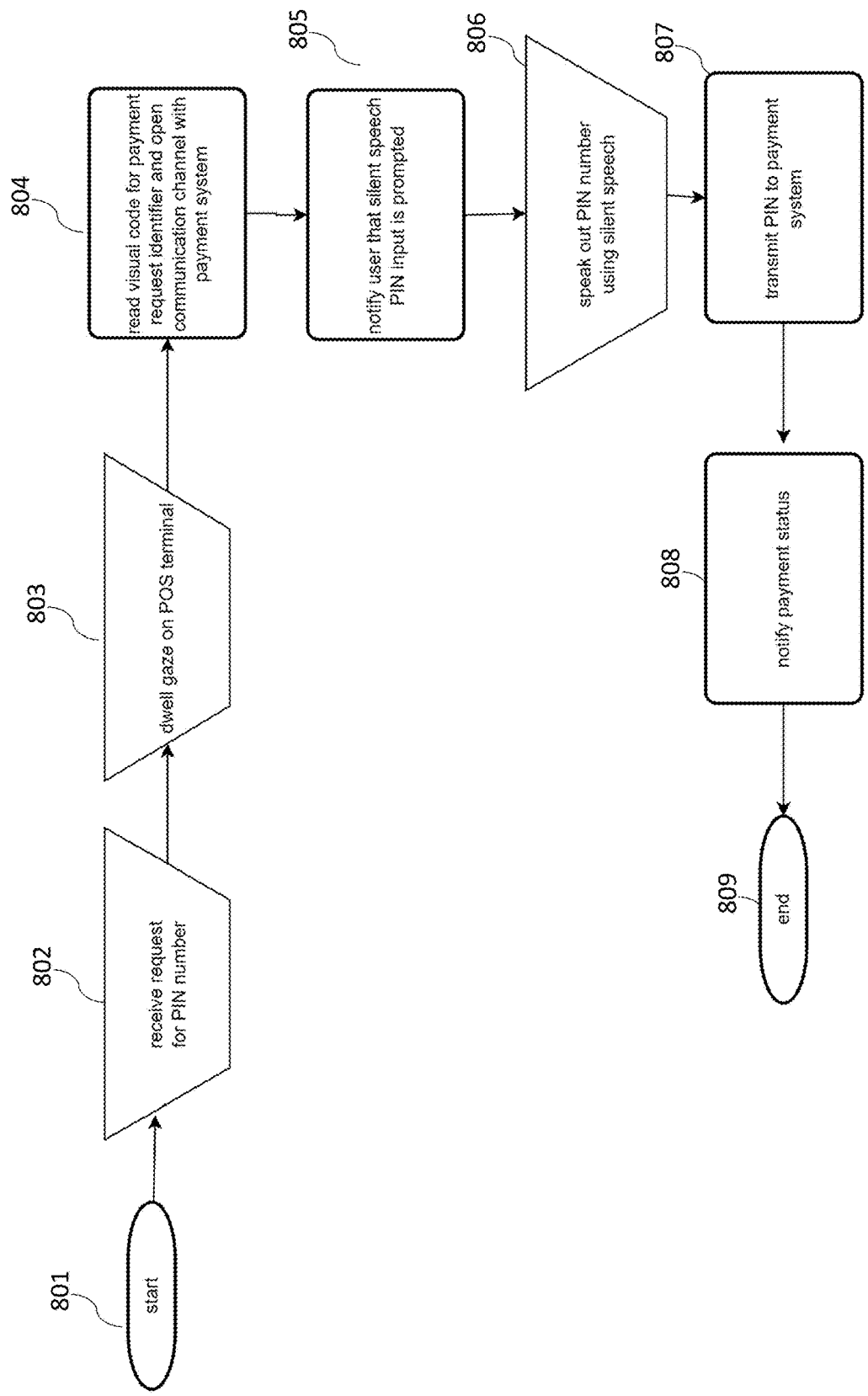
FIG. 8 is a flow chart for a silent speech enabled payment process for an embodiment of the invention.

FIG. 8 is a flow chart depicting a workflow for an embodiment which is entering confidential information, such as a PIN number, during a shop purchase for example. The workflow starts at 801 with the user receiving a request for entering a PIN (personal identification number) 802, such as a PIN used for a credit or debit card for example. A next step may be that the user dwells their gaze on the display of the POS terminal 803. As a next step the system may read, with a word-facing camera, a visual code for a payment request identifier and use that identifier to open a communication channel with the payment system 804. As a next step the user may be notified that silent speech PIN input is prompted. The user may then speak out the PIN number with silent speech 806. The system may then transmit the PIN to the payment system 807 and the workflow may be ended 809 with the system notifying the user of the payment status.

Figure 9:
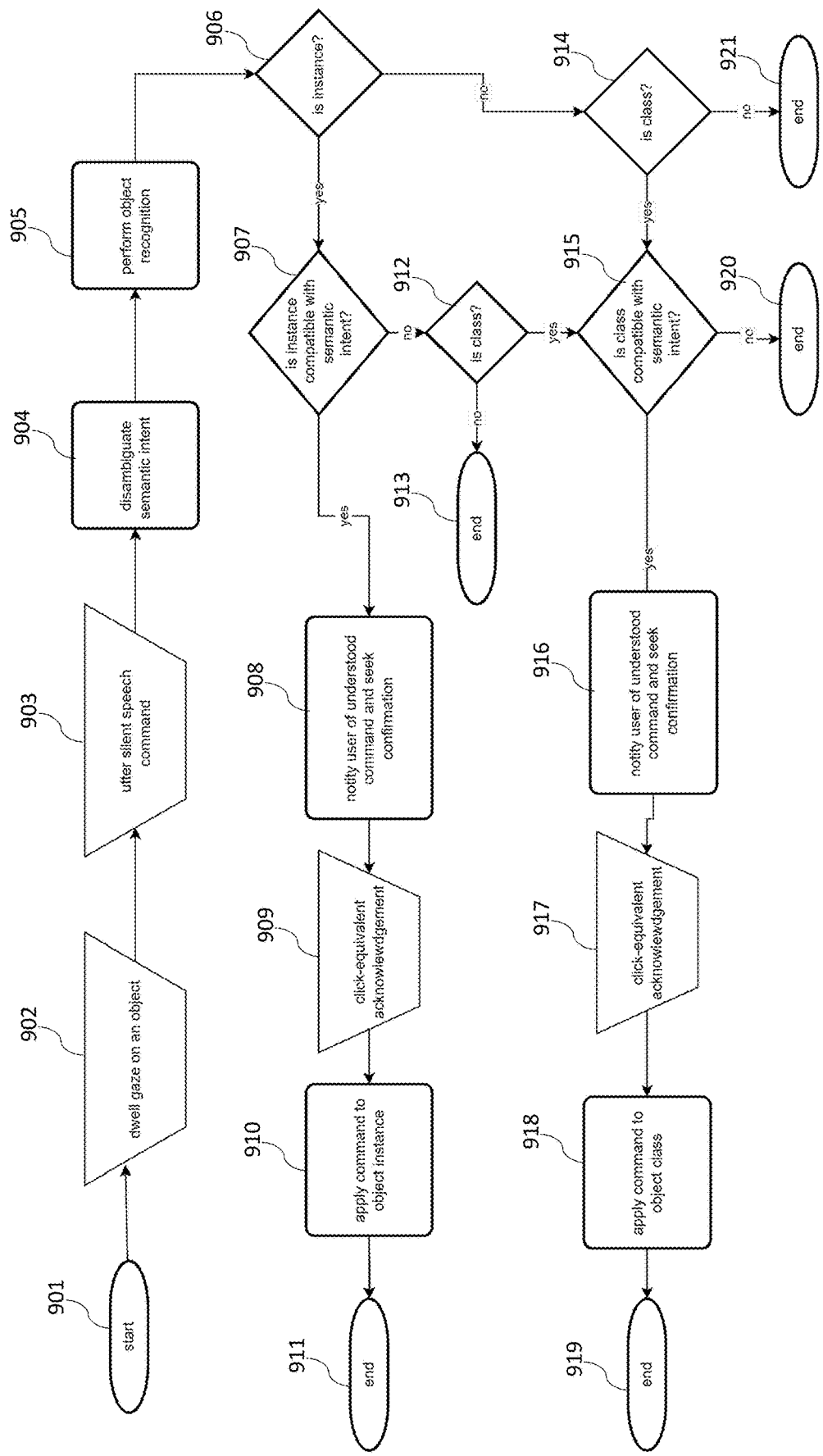
FIG. 9 is a flow chart for a silent speech enabled process for a head mountable embodiment of the invention.

FIG. 9 is a flow chart depicting a workflow for an embodiment which is using a silent speech enabled head-mounted augmented reality device for issuing object related commands, for example "find me one of these on Amazon", "switch it on", "tell me what this is called and which year it was built". This is a type of use case particularly useful for silent speech because augmented reality in a public place usually implies that the user wants to operate in a hands free mode, but at the same time is hesitant to use regular speech input because the user is either too embarrassed to be overheard by the public, or the speech command are too confidential for them to be spoken out aloud in a public place. The workflow starts at 901 with a gaze dwell on an object 902. While gaze dwelling on an object, a silent speech command may be uttered by the user 903. Semantic intent may be defined as being the meaning behind a user input, in the sense of what a user intends to happen in response to them uttering a certain speech input. Semantic intent may be ambiguous, in the one sense that there may be a many-to-one mapping between an utterance and a semantic intent and in the sense that one utterance may potentially apply to a plurality of possible semantic intents, and it is therefore unclear which is the semantic intent which the user had in mind when they made the utterance. Therefore, as a next step the system may attempt to disambiguate the semantic intent of silent speech command 904. Disambiguation of semantic intent may be defined as mapping the received silent speech command to a pre-defined set of possible commands. As a next step object recognition may be performed 905. This step may involve an image search of an image which corresponds to the user's gaze dwell. The image-based search may be of a type which is able to distinguish whether the imaged object is an instance or a class. An instance in this context may be defined as an identifiable specific object for which an object automation interface can be accessed. If, for example, the user is imaging a car, which the object recognition step determines to be the user's own car, then the decision step 906 "is instance?" will be classed as "yes". If on the other hand the object recognition deems to object to be a previously unknown car of a certain model and manufacturer, then the decision step 914 "is class?" would return "yes". As class in this context is defined as a generic group of objects that has the same characteristics or properties. If the imaged object cannot be resolved to either a class or an object, then the workflow fails and ends 921. An instance may be checked whether it is compatible with semantic intent 907. As an example, if the user looks at their own car and commands "tell me how much is one of these", then the semantic intent is clearly incompatible with an instance, in which case a decision is made based on whether the object is also recognized as a class 912. As an example, if the user is looking at their own car, then the system needs to be able to know the generic make and model of the car. If that is the case the decision follows the "yes" route and may arrive at a following decision step "is class compatible with semantic intent?". Otherwise, the flow ends at 913. If the class is not compatible with the semantic intent, then the flow ends likewise at 920. An example a class not being compatible with semantic intent would be "Tell me today's opening hours" when looking at an object which is recognized as a car. If a class or an object compatible with semantic intent, then the following two steps may be the same for both, namely a notification to the user what command has been understood and an (optional) request to confirm the command. This applies to 908 (notify user of understood command and seek confirmation) and 909 (click-equivalent acknowledgement) for instances and 916 (notify user of understood command and seek confirmation) and 917 (click-equivalent acknowledgement) for classes. An example for these steps, for an instance, would be a silent speech command "turn the heater on" when looking at their own car, which would be followed by the notification "You want me to switch on your car's standby heater for 30 minutes?". An example for these steps, for a class, would be a silent speech command "tell me how much one of these costs" when looking at a previously unknown car in a car park, which would be followed by the notification "You want me to find out how much a Merecedes 200D is listed for on AutoTrader?". The instance-related branch ends at 911 after the command has been applied to the object instance 910, usually through Internet-of-things (IOT) mediated automation. The class related branch ends at 919 after the command has been applied to the object class 918, usually through a search engine type query.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications

Herein below are a few definitions and clarifications. As used herein: The terms "a" and "an", when modifying a noun, do not imply that only one of the noun exists. The term "comprise" (and grammatical variations thereof) shall be construed broadly, as if followed by "Without limitation". If A comprises B, then A includes B and may include other things.

The term "e.g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

What is claimed is:

1. A computer-implemented system comprising:
a silent speech input sensor, comprising at least one of: (i) a laser microphone positioned to measure eardrum vibrations, (ii) an internal microphone oriented toward an ear canal of the user, or (iii) a bone-conducting or cartilage-conducting transducer disposed at a head or ear location, configured to detect sub-vocal signals of a user, the sub-vocal signals including at least one of eardrum vibrations measured by a laser microphone, bone-conducted signals, or electromyographic activity;
an eye-tracking unit including an inward-facing camera and processing circuitry configured to determine a gaze vector and a dwell interval on a displayed object; and
a processor programmed to fuse the sub-vocal signals with the gaze dwell data, determine a semantic intent associated with the displayed object, and execute a corresponding command targeted to the displayed object.

2. The system of claim 1, wherein the semantic intent command comprises selection of a displayed object by gaze dwell combined with silent sub-vocal confirmation.

3. The system of claim 1, wherein the processor is further configured to adjust fusion weights dynamically based on confidence levels of sub-vocal signal detection.

4. The system of claim 1, wherein the silent-speech input sensor is disposed in an ear-mountable device operatively coupled to the device that includes the eye-tracking unit.

5. A computer-implemented method comprising:
detecting a sequence of silent-speech sub-vocal signals representing digits of a personal identification number (PIN);
determining, by gaze dwell detection, a target payment terminal or displayed object;
mapping the detected PIN to a transaction intent associated with the target; and
executing the transaction while suppressing audible speech output.

6. The method of claim 5, wherein executing the transaction comprises communicating with a point-of-sale terminal over a wireless protocol.

7. The method of claim 5, wherein the PIN entry is validated by cryptographic authentication before the transaction is completed.

* * * * *